(12) United States Patent
Bradin et al.

(10) Patent No.: US 10,344,235 B2
(45) Date of Patent: Jul. 9, 2019

(54) ALTERNATIVE FUEL AND FUEL ADDITIVE COMPOSITIONS

(71) Applicant: CPS Biofuels, Inc., Raleigh, NC (US)

(72) Inventors: David Bradin, Chapel Hill, NC (US); Guerry L. Grune, Virginia Beach, VA (US); Marty Trivette, Cary, NC (US)

(73) Assignee: CPS Biofuels, Inc, Raleigh, NC (US)

( * ) Notice: Subject to any disclaimer, the term of this patent is extended or adjusted under 35 U.S.C. 154(b) by 387 days.

(21) Appl. No.: 14/263,222

(22) Filed: Apr. 28, 2014

(65) Prior Publication Data
US 2015/0275113 A1 Oct. 1, 2015

Related U.S. Application Data

(63) Continuation of application No. 12/152,845, filed on May 16, 2008, now abandoned, which is a continuation of application No. PCT/US2006/044789, filed on Nov. 17, 2006.

(60) Provisional application No. 60/798,579, filed on May 8, 2006, provisional application No. 60/798,558, filed on May 8, 2006, provisional application No. 60/737,790, filed on Nov. 17, 2005.

(51) Int. Cl.
| | | |
|---|---|---|
| *C10L 1/02* | (2006.01) | |
| *C10L 1/14* | (2006.01) | |
| *C10L 1/16* | (2006.01) | |
| *C10L 1/18* | (2006.01) | |
| *C10L 10/02* | (2006.01) | |
| *C10L 1/182* | (2006.01) | |
| *C10L 1/185* | (2006.01) | |

(52) U.S. Cl.
CPC ............... *C10L 1/18* (2013.01); *C10L 1/02* (2013.01); *C10L 1/023* (2013.01); *C10L 1/026* (2013.01); *C10L 1/14* (2013.01); *C10L 10/02* (2013.01); *C10L 1/1608* (2013.01); *C10L 1/1616* (2013.01); *C10L 1/1824* (2013.01); *C10L 1/1852* (2013.01); *C10L 2200/043* (2013.01); *C10L 2200/0423* (2013.01); *C10L 2200/0446* (2013.01); *C10L 2200/0492* (2013.01); *C10L 2230/22* (2013.01); *C10L 2270/023* (2013.01); *C10L 2270/026* (2013.01); *C10L 2270/04* (2013.01); *Y02E 50/13* (2013.01)

(58) Field of Classification Search
CPC .. C10L 10/02; C10L 1/02; C10L 1/023; C10L 1/026; C10L 1/14; C10L 1/1608; C10L 1/1616; C10L 1/18; C10L 1/1824; C10L 1/1852; C10L 2200/0423; C10L 2200/043; C10L 2200/0446; C10L 2200/0492; C10L 2230/22; C10L 2270/023; C10L 2270/026; C10L 2270/04; Y02E 50/13

USPC ............ 252/373; 423/418.2, 648.1; 435/134, 435/157, 160, 161, 167, 168; 44/605; 518/702; 554/175, 8; 568/913; 585/240

See application file for complete search history.

(56) References Cited

U.S. PATENT DOCUMENTS

| | | | | |
|---|---|---|---|---|
| 2,184,956 A | * | 12/1939 | Gilliland ................. | C10L 1/023 44/443 |
| 2,513,669 A | * | 7/1950 | Partridge ................ | C10L 1/103 44/385 |
| 4,398,921 A | * | 8/1983 | Rifkin ..................... | C10L 1/023 252/396 |
| 4,610,696 A | * | 9/1986 | Bernasconi .............. | C10L 1/18 44/443 |
| 5,308,365 A | * | 5/1994 | Kesling, Jr. ............. | C10L 1/026 44/443 |
| 2002/0035802 A1 | * | 3/2002 | Paul ........................ | C10L 1/023 44/451 |
| 2005/0044778 A1 | * | 3/2005 | Orr .......................... | C10L 1/12 44/320 |

FOREIGN PATENT DOCUMENTS

GB 591101 A * 8/1947 ................ C10L 1/06

* cited by examiner

*Primary Examiner* — Latosha Hines
(74) *Attorney, Agent, or Firm* — ePatentManager.com; Guerry L. Grune

(57) ABSTRACT

Alternative gasoline, diesel fuel, marine diesel fuel, jet fuel, and flexible fuel compositions are disclosed. The compositions include an alcohol and/or a glycerol ether or mixture of glycerol ethers, which can be derived from renewable resources. When combined with gasoline/ethanol blends, glycerol ethers can reduce the vapor pressure of ethanol and increase fuel economy. Added to diesel fuel/alcohol blends, glycerol ethers improve the cetane value of the blends. In jet fuel, glycerol ethers can replace all or part of conventional deicing additives, lowering skin toxicity, and glycerol ethers ability to reduce particulate emissions can lower the appearance of contrails. Used in marine diesel, the reduction in particulate emissions can be environmentally significant. In another embodiment, the alternative compositions comprise gasoline, ethanol, and n-butanol, and in one aspect, the ethanol and/or n-butanol can be derived from renewable resources. Fuel additive compositions, including glycerol ethers and hydrocarbons and/or alcohols, are also disclosed.

6 Claims, No Drawings

ALTERNATIVE FUEL AND FUEL ADDITIVE COMPOSITIONS

This Continuation application claims priority to and incorporates fully by reference U.S. application Ser. No. 12/152,845, filed 16 May 2008, entitled "Alternative Fuel and Fuel Additive Compositions", which is a continuation of International Application No. PCT/US2006/044789, filed 17 Nov. 2006 and titled "Alternative Fuel and Fuel Additive Compositions". Priority is also claimed under 35 U.S.C. 120 and 35 U.S.C. 365, and under 35 U.S.C. 119(e) of U.S. Provisional Application No. 60/737,790, filed 17 Nov. 2005 and titled "Distillate Fuels", U.S. Provisional Application No. 60/798,558, filed 8 May 2006 and titled "Fuel/Alcohol Compositions" and U.S. Provisional Application No. 60/798,579, filed 8 May 2006 and titled "Fuel/Alcohol Additive Compositions".

FIELD OF THE INVENTION

The present invention relates to alternative fuel and fuel additive compositions, including blends of alcohols such as methanol, ethanol and/or butanol, with fuels such as gasoline, diesel, marine diesel, jet fuel, and/or biodiesel fuels.

BACKGROUND OF THE INVENTION

Diesel fuel, jet fuel, and gasoline are petroleum products derived from crude oil. Crude oil is, of course, a nonrenewable resource of finite supply. Accordingly, extensive research effort is now being directed toward replacing some or all petroleum-based diesel fuel with either a fuel derived from a renewable source such as farm crops (biodiesel) or a fuel derived from Fischer-Tropsch synthesis (syntroleum). For example, research is being conducted on replacing gasoline and diesel fuel with gasoline/ethanol and diesel fuel/ethanol blends.

There are problems associated with gasoline/ethanol and diesel fuel/ethanol blends. With gasoline/ethanol blends, the relatively high vapor pressure of the ethanol can be problematic, particularly when starting a car in the wintertime. With diesel/ethanol blends, the lower energy output of the ethanol (i.e., lower cetane value) makes the resulting fuel less than optimal.

Unlike regular diesel fuel, marine diesel oil contains some heavy fuel oil, and sometimes contains waste products such as used motor oil. While marine diesel engines are reliable and fuel efficient, they also produce relatively high levels of particulate emissions, up to fifty times more than gasoline engines. These emissions add to the visible pollution attributable to shipping, and adversely affect air quality. The particulate emissions associated with marine diesel are so significant that efforts are underway to find ways to minimize these emissions. It would be advantageous to provide alternative marine diesel oil compositions that provide less particulate emissions.

Jet fuel is a mixture of a variety of compounds, including hydrocarbons such as cycloparaffins, n-paraffins, isoparaffins, and aromatics, typically in the range of $C_{5-20}$, such as naphthalenes and alkylbenzenes, and, occasionally, oxygenates such as ethylene glycol monobutyl ether and ethylene glycol monoethyl ether, which are used as icing inhibitors. The range of hydrocarbons in jet fuel typically ranges from $C_{5-15}$, although hydrocarbons above $C_{15}$ can also be used. Significant efforts have been undertaken to provide renewable compositions that can replace all or part of jet fuel.

It is known that JP-8, a type of jet fuel commonly used by the U.S. military, induces dermal immunotoxicity. JP-8 is produced from commercial Jet-A fuel by blending in an additive package containing diethylene glycol monomethyl ether, (DiEGME) as an anti-icing compound. It has been suggested that DiEGME is a dermal immunotoxin, and may be involved in JP-8-induced immune suppression. It would be advantageous to provide alternative de-icing compositions, particularly those which are renewable and which are not associated with immune suppression.

Fuel additives are marketed directly to retail consumers, usually in single or dual-use sized containers of approximately 12 fl oz for between $1.75 to $5 (a price equivalent to $18.66 to $53 per gallon). They are advertised as improving fuel efficiency and increasing gas mileage. They are sold at large-scale retail outlets such as Wal-Mart, gas station-affiliated convenience stores, and elsewhere. One well-known example of such products is the STP® line, owned by Clorox Corp. Fuel additives produced by STP include "Gas Treatment", "Super Concentrated Gas Treatment", "Complete Fuel System Cleaner", "Super Concentrated Fuel Injection Cleaner", "Fuel Injector and Carburetor", "Octane Performance Booster", "All Season Water Remover", "Diesel Fuel Treatment & Injector Cleaner", and "Lead Substitute". Other well-known lines of fuel additive products include Prestone, Marvel Mystery Oil, and Valvoline (Pyroil). Such products are marketed to help restore lost fuel efficiency, keep fuel intake systems clean, and restore lost horsepower.

These products contain primarily petroleum-based components. For example, STP's Octane Performance Booster contains, in addition to a trade-secret additive, naphthalene; 1,2,4-Trimethylbenzene; Mesitylene; Xylene; Petroleum Distillates (JP5 jet fuel); Stoddard Solvent; Kerosene, petroleum, hydrodesulfurized; Solvent Naptha, petroleum, medium aliphatic; and, Solvent Naphtha, petroleum, light aromatic.

These products tend to function by improving engine performance, rather than by improving the effectiveness of the fuel itself. For example, STP's "Super Concentrated Gas Treatment" dissolves deposits that may accumulate in the fuel system (including fuel injectors, intake valves, and carburetor). All engines develop combustion chamber deposits that can lead to the engine needing higher-octane gasoline than recommended by the manufacturer to operate efficiently. STP's "Octane Performance Booster" helps remove combustion chamber deposits to reduce an engine's appetite for higher-octane gasoline, reducing knocking and pinging, and restoring lost performance.

In some cases, these retail additives are intended for consumers affected by changes in the national gasoline market. For example, lead began to be phased out of gasoline sold in the U.S. beginning in the 1970's. A product such as STP's "Lead Substitute" can be mixed with unleaded gasoline to allow such gasoline's use in older cars that would otherwise have required leaded gasoline. Such products allow older cars to operate properly in an environment where the optimal fuel is not readily available.

According to the Federal Trade Commission (http://www.ftc.gov/bcp/conline/pubs/autos/gasave.htm), "no government agency endorses gas-saving products for cars. The most that can be claimed in advertising is that the EPA has reached certain conclusions about possible gas savings by testing the product or by evaluating the manufacturer's own test data."

It would be advantageous to provide alternative fuels and fuel additive compositions, for use in gasoline, diesel, marine diesel, and jet engines. It would further be advantageous to provide alternative fuels which overcome the limitations of current gasoline/ethanol and diesel/ethanol blends. The present invention provides such alternative fuel and fuel additive compositions, and methods for producing same.

SUMMARY OF THE INVENTION

Alternative fuel compositions and methods for their preparation and use are disclosed. The alternative fuel compositions include one or more conventional fuels, in combination with one or more renewable components.

In one embodiment, the renewable component is a glycerol ether or blend of glycerol ethers. The glycerol ethers include one, two, or three $C_{1-10}$ alkyl groups, preferably one or two $C_{3-5}$ groups, more preferably one or two t-butyl groups. When present in alternative fuel compositions, the glycerol ethers are typically present in an amount of between about 0.5 and 15 percent by volume, in one aspect, between about 1 and about 10 percent by volume, in another aspect, between about 2 and about 8 percent by volume, and in another aspect, around 5 percent by volume.

Gasoline/ethanol blends suffer from relatively low energy content per unit volume. For example, E85, a mixture of about 85% ethanol and about 15% gasoline by volume tends to provide roughly 20% fewer miles per gallon than gasoline. Blends of glycerol ethers with gasoline/ethanol blends can improve their gasoline mileage. The glycerol ethers are present in a range of between about 1 to about 15% by volume, preferably between about 2 and about 12 percent by volume, more preferably, between about 4 and about 8 percent by volume. The gasoline/ethanol blends can include between about 5 and about 85% ethanol by volume, in one embodiment, between about 15 and about 85% by volume (i.e., E85).

In one aspect, the fuel is E85, in a second aspect, the fuel is E10. In a third aspect, the amount of alcohol is between about 1 and 20 percent by volume, and more ideally, about 10 to 20 percent by volume of the fuel composition, with gasoline being present in about 75 to about 85 percent by volume of the fuel composition. In a fourth aspect, the amount of alcohol is between about 75 and 85 percent by volume of the fuel composition. In any of these aspects, although any amount of glycerol ethers can be present, the composition typically comprises between about 1 to about 15 percent glycerol ethers, by volume, based on the total volume of the fuel composition plus glycerol ethers.

In another aspect, the fuel includes only gasoline (i.e., gasoline itself is combined with glycerol ethers, but no alcohol is present). In this embodiment, the glycerol ethers are present in a fuel additive, alone or in combination with various conventional fuel additives, such as hydrocarbons. Fatty acids can also be present, as can fatty acid alkyl esters.

Glycerol ethers can be also combined with ethanol and/or butanol to form an alternative fuel composition, with or without the addition of gasoline. The high oxygenate concentration results in a clean burning fuel or fuel additive.

Diesel fuel is combined with up to 10% ethanol, but this composition has less energy per unit volume than diesel fuel. A further embodiment of the present invention is a fuel composition including diesel fuel including between about 5 and about 15% by volume ethanol and between about 1 and about 15% glycerol ether(s). The diesel fuel can be conventional diesel fuel, or can include any amount of biodiesel fuel (i.e., alkyl esters of fatty acids) or syntroleum (hydrocarbons in the diesel fuel range derived from Fischer-Tropsch synthesis). In one aspect, the diesel fuel/alcohol blends including between about 75 and 95% diesel/5 and 25% alcohol, ideally, about 90% diesel and about 10% alcohol, are combined with glycerol ethers, for example, in a range of between about 1 and about 10% by volume, ideally from about 2 to about 8 percent by volume, and more ideally, around 5 percent by volume.

A further embodiment of the present invention relates to blends of glycerol ethers and marine diesel. These blends can significantly reduce the particulate emissions of marine diesel fuel, relative to marine diesel alone. The glycerol ether is present in a range of from about 1 to about 15% by volume, preferably between about 2 and about 10% by volume, more preferably, between about 4 and about 8% by volume.

Still a further embodiment relates to jet fuel incorporating glycerol ethers as deicing additives. Glycerol ethers can improve the safety of the jet fuel compositions, relative to compositions including diethylene glycol monomethyl ether, which is known to cause dermal immunotoxicity. The glycerol ethers can be incorporated in substantially the same percentages as the conventional deicing additives, which typically range from about 0.1 to about 4 percent by volume. As an added benefit, the addition of glycerol ethers can reduce the particulate emissions, which can lower the appearance of contrails, thus providing an environmental benefit. In one embodiment, butanol, in place of or in addition to glycerol ethers, is used as an oxygenate additive in jet fuel. In another embodiment, the alternative jet fuel composition includes those hydrocarbons typically found in JP-8, but glycerol ethers are present in addition to or in lieu of ethylene glycol ethers.

The alternative fuel can also be a gasoline/alcohol blend, where the alcohol includes a combination of a) methanol and/or ethanol and b) n-butanol, sec-butanol, or t-butanol, where the alcohols are present in amounts up to about 90 percent by volume of the gasoline/alcohol blend. In one aspect of this embodiment, gasoline is blended with between about 5 and about 85 percent by volume of ethanol, between about 5 and about 85 percent by volume of butanol (n-butanol, sec-butanol, and/or t-butanol), and between about 5 and 85 percent by volume of gasoline. Butanol provides roughly the same energy content per unit volume as gasoline, whereas ethanol provides relatively lower energy content than gasoline. Ethanol and butanol can both be formed by fermenting sugars such as glucose and xylose, which can be formed by depolymerizing cellulose and hemicellulose, respectively. Glucose is relatively easy to ferment to ethanol using yeasts, and xylose is relatively easy to ferment to butanol using certain bacteria, such as *Clostridium acetobutylicum*. However, it is relatively inefficient to ferment xylose to ethanol, due to the formation of xylose as a major by-product. Since these two sugars (glucose and xylose) are more easily fermented by different biological agents to form different products (i.e., ethanol and butanol), combinations of both ethanol and butanol in gasoline will take advantage of the entire cellulosic sugar composition, and provide the fuel with better properties than either alcohol alone. That is, ethanol has relatively low energy content per unit volume, and butanol can increase the relative energy content of the alternative fuel. Butanol has a strong odor, which can be mitigated by using both ethanol and gasoline to dilute the odor.

The glycerol ethers can have from one to three of the hydroxyl group on glycerol etherified with a $C_{1-10}$ alkyl group, and can exist as purified compounds, or as mixtures of a variety of glycerol ethers. It is preferred that at least a portion of the glycerol ethers include one or two hydroxyl groups, so that the product has the ability to hydrogen bond with ethanol, and thus help lower the vapor pressure of the ethanol.

The glycerol ethers lower the vapor pressure of the ethanol in gasoline/ethanol blends, thus improving their performance. The glycerol ethers also increase the cetane value of diesel/ethanol blends, which improves their performance as well.

The glycerol ethers, when combined with conventional diesel fuel, biodiesel fuel, or conventional gasoline products, provide advantageous properties similar to those provided by methyl t-butyl ether (MTBE). The glyceryl ethers lower the viscosity of the fuel, and hydroxy groups on partially etherified glycerol may help to incorporate a small amount of water into the fuel, which can lower $NO_x$ emissions.

The glycerol ethers can be prepared by reacting an olefin or alcohol with glycerol, using an acid catalyst. The acid catalyst can be a proton source, such as hydrochloric acid, sulfuric acid, and hydrobromic acid, or can be a Lewis acid, for example, aluminum chloride, ferrous chloride, and zeolites.

The olefins are typically $C_{2-6}$ olefins, ideally $C_{3-4}$ olefins, and preferably, are either isobutylene or propylene. The mole ratio of olefin to glycerol ranges between 1/1 and 3/1, but is ideally in the range of about 2/1. That is, it is believed that di-ethers are preferable to mono-ethers and tri-ethers, although mixtures of mono-, di- and/or tri-ethers are within the scope of the invention.

The olefins can be derived, in whole or in part, by Fischer-Tropsch synthesis on syngas formed using, for example, coal, glycerol, ethanol, methanol, methane, or lignin as a starting material. The etherification, when performed using an olefin, can be run at room temperature, to avoid excessive polymerization of the olefin, although higher temperatures may be required when the olefins are not highly substituted (i.e., will not generate a secondary or tertiary carbocation as a reactive intermediate). Use of ferrous chloride can be preferred, since this catalyst is known to minimize the polymerization of olefins. If the etherification and esterification are run at temperatures in excess of 70° C., a some amount of olefin dimerization, trimerization, and polymerization might be observed.

The resulting alternative fuel is derived, at least in part, from renewable resources, in that the glycerol and/or other components such as alcohols, can be derived from renewable resources. In those embodiments where the fuel comprises diesel fuel, the presence of biodiesel and/or syntroleum (which can be blended in any desired ratio), in the fuel can help reduce U.S. dependence on foreign crude oil.

Fuel additive compositions, for use in gasoline, diesel, marine diesel, jet, and flexible fuel engines, and methods for their preparation and use, are also disclosed. The diesel fuel can be conventional diesel fuel, or can include any amount of biodiesel fuel (i.e., alkyl esters of fatty acids) or syntroleum (hydrocarbons in the diesel fuel range derived from Fischer-Tropsch synthesis).

The additives include glycerol ethers, in an amount up to about 100 percent by volume, and hydrocarbons such as kerosene and/or jet fuel, in an amount up to about 95 percent by volume. Ideally, the amount of glycerol ethers and hydrocarbons is, individually, between about 1 and 90 percent by volume, and more ideally, about 15 to 80 percent by volume.

The glycerol ethers, when combined with conventional diesel fuel, biodiesel fuel, marine diesel fuel, gasoline, gasoline/alcohol blends, or jet fuel, provide advantageous properties similar to those provided by methyl t-butyl ether (MTBE). MTBE was an attractive additive from an emissions perspective because it has no sulfur, aromatics, or olefins, which contribute to air emissions. In addition, MTBE had some important indirect benefits. When MTBE was added, it diluted those chemical properties in the blend that increase air emissions, reducing their average concentration. Furthermore, MTBE's distillation profile and vapor pressure required little if any adjustment to the base gasoline to which it was added. MTBE's high octane allowed refiners to reduce the severity at which they ran their reformers, which in turn reduced the aromatic content of the reformulated gasoline. Glycerol ethers will accomplish the same. The glycerol ethers lower the viscosity of the fuel, and hydroxy groups on partially etherified glycerol may help to incorporate a small amount of water into the fuel, which can lower $NO_x$ emissions.

DETAILED DESCRIPTION OF THE INVENTION

Fuels such as marine diesel or jet fuel, or fuel blends such as gasoline/ethanol or diesel/ethanol fuel compositions, that also include glycerol ethers or butanol, as well as methods for preparing the fuel compositions, are disclosed. Depending on the nature of the starting fuel or fuel blend, the resulting fuel compositions can be used to fuel gasoline, jet, diesel, and/or marine diesel fuel engines to provide an alternative to similar fuels produced entirely from crude oil.

As used herein, the term "renewable components" refers to components that can be, but need not be, produced from renewable resources. That is, while ethanol and butanol can be produced by fermentation, they can also be produced from petrochemical sources. Some renewable components are produced by reacting a renewable material, such as glycerol, with a petrochemical component, such as isobutylene.

In some embodiments, the processes described herein are integrated processes. As used herein, the term "integrated process" refers to a process which involves a sequence of steps, some of which may be parallel to other steps in the process, but which are interrelated or somehow dependent upon either earlier or later steps in the total process.

The following definitions will further define the invention:

The term "alkyl", as used herein, unless otherwise specified, refers to a saturated straight, branched, or cyclic hydrocarbon of $C_{1-6}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl.

The term "olefin" refers to an unsaturated straight, branched or cyclic hydrocarbon of $C_{2-10}$, and specifically includes ethylene, propylene, butylene, isobutylene, pentene, cyclopentene, isopentene, hexene, cyclohexene, 3-methylpentene, 2,2-dimethylbutene, 2,3-dimethylbutene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, and 5-decene. Ethylene, propylene and isobutylene can be preferred due to their relatively low cost, and $C_{2-8}$ olefins can be preferred as they are produced as the major products in Fischer-Tropsch synthesis when an iron catalyst is used.

Highly substituted olefins are preferred because they can stabilize a carbocation intermediate more readily than unsubstituted olefins.

I. Fuel Compositions

A variety of fuel compositions include hydrocarbons in the $C_{5-20}$ range, including diesel, gasoline, and jet fuel. Marine diesel also falls largely in this range, but often includes used motor oil and other components that may include hydrocarbons outside this range. Most hydrocarbons used for fuel, be it gasoline, diesel, jet, or marine diesel, have boiling points in the range of between about 68-450° F. Specifications for the most commonly used diesel fuel (No. 2) are disclosed in ASTM D 975. The minimum flash point for diesel fuel is 52° C. (125° F.).

A. Jet Fuel

Jet fuels are well known to those of skill in the art. Specifications for jet fuel are disclosed in ASTM D 1655, standard Specification for Aviation Turbine Fuels. The minimum flash point for jet fuel is typically 38° C. Among the various well known formulations for jet fuel are civil and military jet fuels.

Civil Jet Fuels

There are currently two grades of turbine fuel used in civil commercial aviation. These include Jet A-1 and Jet A, both of which are kerosene-type fuels. Jet B is another jet fuel, which is a wide cut kerosene (a blend of gasoline and kerosene). Jet B is rarely used, except in very cold climates.

Jet A-1

Jet A-1 is a kerosene grade of fuel, and can be used for most turbine engine aircraft. There is a stringent internationally agreed standard for Jet A-1, which is well known to those of skill in the art. Jet A-1 has a flash point above 38° C. (100° F.) and a freeze point maximum of −47° C. Among the standards for Jet A-1 are British specification DEF STAN 91-91 (Jet A-1), (formerly DERD 2494 (AVTUR)), ASTM specification D1655 (Jet A-1) and IATA Guidance Material (Kerosene Type), and NATO Code F-35.

Jet A

Jet A is a similar kerosene type of fuel, but is normally only available in the U.S.A. It has the same flash point as Jet A-1, but a higher freeze point maximum (−40° C.). Jet A is well known to those of skill in the art, and falls under the ASTM D1655 (Jet A) specification.

Jet B

Jet B is a distillate covering the naphtha and kerosene fractions. It tends to be more highly flammable than Jet A-1, and is typically used in very cold climates where its better cold weather performance is important. Jet B is also well known to those of skill in the art, and falls under Canadian Specification CAN/CGSB 3.23.

Military Jet Fuels

JP-4

JP-4 is similar to Jet B, but adds corrosion inhibitors and anti-icing additives. JP-4 is well known to those of skill in the art, and falls under U.S. Military Specification MIL-PRF-5624S Grade JP-4, British Specification DEF STAN 91-88 AVTAG/FSII (formerly DERD 2454), where FSII stands for Fuel Systems Icing Inhibitor, and NATO Code F-40.

JP-5

JP-5 is a high flash point kerosene, and falls under U.S. Military Specification MIL-PRF-5624S Grade JP-5, British Specification DEF STAN 91-86 AVCAT/FSII (formerly DERD 2452), and NATO Code F-44.

JP-8

JP-8 is similar to Jet A-1, but adds corrosion inhibitors and anti-icing additives. It is a widely used and well known jet fuel, falling under U.S. Military Specification MIL-T-83188D, British Specification DEF STAN 91-87 AVTUR/FSII (formerly DERD 2453), and NATO Code F-34.

Aviation Fuel Additives

Aviation fuel additives are typically added to jet fuel in very small quantities, often measurable only in parts per million. These additives provide special or improved qualities to the jet fuel. The desired amount of these additives is well known to those of skill in the art, and often controlled by appropriate specifications. A few of the more common additives are discussed below:

Anti-knock additives such as tetra-ethyl lead (TEL) reduce the tendency of gasoline to detonate.

Anti-oxidants prevent the formation of gum deposits on fuel system components caused by oxidation of the fuel in storage and also inhibit the formation of peroxide compounds in certain jet fuels.

Static dissipator additives reduce the hazardous effects of static electricity generated by movement of fuel through modern high flow-rate fuel transfer systems.

Corrosion inhibitors protect ferrous metals in fuel handling systems, such as pipelines and fuel storage tanks, from corrosion, and may improve the lubricity of certain jet fuels.

Anti-icing additives reduce the freezing point of water precipitated from jet fuels due to cooling at high altitudes. These additives can prevent ice crystal formation, which would otherwise restrict the flow of fuel to the engine, but do not affect the freezing point of the fuel itself. Anti-icing additives can also provide some antimicrobial effects to the jet fuel, although other biocides can be added. Diethylene glycol mono-alkyl ethers are often used, but are known to cause skin toxicity and other dermatological problems. Replacement of some or all of these anti-icing additives with glycerol ethers can reduce the dermal toxicity. Further, as glycerol ethers can lower the particulate emissions of fuels, they can reduce the presence of contrails when added to jet fuel.

Metal de-activators suppress the catalytic effect which some metals, particularly copper, have on fuel oxidation.

Thermal Stability Improver additives are sometimes added to JP-8 to produce JP-8+100. These additives inhibit deposit formation in high temperature areas of the aircraft fuel system.

In one embodiment, the alternative jet fuel composition includes those hydrocarbons typically found in JP-8, but glycerol ethers are present in addition to or in lieu of ethylene glycol ethers or other such conventional deicing additives.

In addition to petroleum-based fuels, fuels derived from other sources can also be used. Examples include biodiesel and syntroleum (fuels derived from the Fischer-Tropsch synthesis using syngas).

B. Biodiesel

The alternative fuel compositions described herein can include biodiesel. Biodiesel is a fatty acid alkyl ester, where the ester is not a glycerol ester, but rather, an ester formed with a monohydroxy alcohol. Examples of alcohols used to prepare biodiesel fuel include methanol, ethanol, and mixtures thereof, although virtually any $C_{1-10}$ alcohol can be used. The biodiesel is typically formed by transesterification of a triglyceride with an alcohol, although it can also be formed by esterification of a free fatty acid.

Any source of triglycerides can be used to prepare the biodiesel fuel that provides the fuel with acceptable properties (that is, which functions as a diesel fuel). Preferred sources of triglycerides for use in practicing the present invention include, but are not limited to, vegetable oils and fats, as well as animal oils and fats. Examples of suitable vegetable oils include, but are not limited to, crude or refined soybean, corn, coconut (including copra), palm, rapeseed, cotton and oils. Examples of suitable animal fats include, but are not limited to, tallow, lard, butter, bacon grease and yellow grease. Naturally-occurring fats and oils are the preferred source of triglycerides because of their abundance and renewability. Oils with a higher boiling point are preferred over oils with a lower boiling point.

B. Syntroleum

Syntroleum is a term used to describe diesel fuel produced by a process comprising Fischer-Tropsch synthesis. Fischer-Tropsch synthesis converts syngas to a mixture of hydrocarbons. Syngas, a mixture of hydrogen and carbon monoxide, can be formed from a variety of feedstocks, including coal, methane, methanol, ethanol, glycerol and lignin, and several of these feedstocks are renewable.

Hydrocarbons derived from Fischer-Tropsch synthesis have also been used as jet fuel, or incorporated into jet fuel. Such jet fuel or jet fuel blends are known in the art. The use of Fischer-Tropsch synthesis to form syntroleum is well known, as is the use of Fischer-Tropsch synthesis to form relatively low molecular weight olefins. A brief discussion of Fischer-Tropsch synthesis is provided below.

i. Synthesis Gas (Syngas) Production

It is known in the art to convert a variety of feedstocks, such as coal, methane, methanol, ethanol, glycerol, and lignin to synthesis gas (see, for example, [http://www.biocap.ca/files/biodiesel/dalai.pdf]). The water-gas-shift reaction plays an important role in the conversion of certain of these feedstocks to hydrogen via steam gasification and pyrolysis. Catalytic steam gasification can give high yields of syngas at relatively low temperatures.

The resulting syngas can be used in Fischer-Tropsch Synthesis. The syngas can be converted to a range of hydrocarbon products, collectively referred to as syncrude, via Fischer-Tropsch synthesis. Alternatively, low molecular weight olefins can be formed, which can be used directly in the glycerol ether synthesis.

ii. Fischer-Tropsch Chemistry

Fischer-Tropsch chemistry tends to provide a wide range of products from methane and other light hydrocarbons to heavy wax. Syntroleum is typically formed from the wax/heavy fraction obtained during Fischer-Tropsch Synthesis using a cobalt catalyst, or other catalyst with high chain growth probabilities. Low molecular weight olefins are obtained from the light gas/naphtha heavy fraction obtained via Fischer-Tropsch chemistry using iron catalysts, or other catalysts with low chain growth probabilities.

Syngas is converted to liquid hydrocarbons by contact with a Fischer-Tropsch catalyst under reactive conditions. Depending on the quality of the syngas, it may be desirable to purify the syngas prior to the Fischer-Tropsch reactor to remove carbon dioxide produced during the syngas reaction and any sulfur compounds, if they have not already been removed. This can be accomplished by contacting the syngas with a mildly alkaline solution (e.g., aqueous potassium carbonate) in a packed column.

In general, Fischer-Tropsch catalysts contain a Group VIII transition metal on a metal oxide support. The catalyst may also contain a noble metal promoter(s) and/or crystalline molecular sieves. Pragmatically, the two transition metals that are most commonly used in commercial Fischer-Tropsch processes are cobalt or iron. Ruthenium is also an effective Fischer-Tropsch catalyst but is more expensive than cobalt or iron. Where a noble metal is used, platinum and palladium are generally preferred. Suitable metal oxide supports or matrices which can be used include alumina, titania, silica, magnesium oxide, silica-alumina, and the like, and mixtures thereof.

Although Fischer-Tropsch processes produce a hydrocarbon product having a wide range of molecular sizes, the selectivity of the process toward a given molecular size range as the primary product can be controlled to some extent by the particular catalyst used. When forming syntroleum, it is preferred to produce $C_{20-50}$ paraffins as the primary product, and therefore, it is preferred to use a cobalt catalyst, although iron catalysts may also be used.

The Fischer-Tropsch reaction is typically conducted at temperatures between about 300° F. and 700° F. (149° C. to 371° C.), preferably, between about 400° F. and 550° F. (204° C. to 228° C.). The pressures are typically between about 10 and 500 psia (0.7 to 34 bars), preferably between about 30 and 300 psia (2 to 21 bars). The catalyst space velocities are typically between about from 100 and 10,000 cc/g/hr., preferably between about 300 and 3,000 cc/g/hr.

The reaction can be conducted in a variety of reactors for example, fixed bed reactors containing one or more catalyst beds, slurry reactors, fluidized bed reactors, or a combination of different type reactors. Fischer-Tropsch processes which employ particulate fluidized beds in slurry bubble column reactors are described in, for example, U.S. Pat. Nos. 5,348,982; 5,157,054; 5,252,613; 5,866,621; 5,811,468; and 5,382,748, the contents of which are hereby incorporated by reference.

Low molecular weight fractions can be obtained using conditions in which chain growth probabilities are relatively low to moderate, and the product of the reaction includes a relatively high proportion of low molecular weight ($C_{2-8}$) olefins and a relatively low proportion of high molecular weight ($C_{30+}$) waxes. These olefins can be reacted with glycerol to form glycerol ethers.

High molecular weight fractions can be obtained using conditions in which chain growth probabilities are relatively high, and the product of the reaction includes a relatively low proportion of low molecular weight ($C_{2-8}$) olefins and a relatively high proportion of high molecular weight ($C_{30+}$) waxes. After the wax product is dehydrogenated, it can be further reacted to form syntroleum, using known processes such as hydrocracking and molecular averaging.

Methods for thermally cracking or hydrocracking hydrocarbons are known to those of skill in the art. Representative Lewis acid catalysts and reactions conditions are described, for example, in Fluid Catalytic Cracking II, Concepts in Catalyst Design, ACS Symposium Series 452, Mario Occelli, editor, American Chemical Society, Washington, D.C., 1991, the contents of which are hereby incorporated by reference.

II. Glycerol Ethers

Glycerol ethers are defined as compounds in which one, two or three of the hydroxy groups (OH) in glycerol has been etherified (O-alkyl). The synthesis of glycerol ethers has been described, for example, in U.S. Pat. Nos. 5,308,365, 1,968,033 and 5,578,090. The ethers can be formed, for example, by reacting olefins or an alcohol with glycerol in the presence of an acid catalyst. Preferably, at least a portion of the glycerol ethers includes one or two hydroxyl groups. This can be preferred because of the potential for hydrogen bonding between the glycerol ethers and any alcohols, such as methanol, ethanol, and butanol, which might be present, which can help lower the vapor pressure of the alcohol in the alternative fuel compositions described herein. Glycerol ethers can also be prepared by reacting glycerol with an alkyl halide in the presence of a base.

Olefins suitable for the etherification reaction include $C_{2-10}$ straight, branched, or cyclic olefins, and in one embodiment, the olefins contain only hydrogen and carbon. Suitable olefins for use in the present invention include, but are not limited to, ethylene, propylene, butylene, isobutylene, pentene, cyclopentene, isopentene, hexene, cyclohexene, 3-methylpentene, 2,2-dimethylbutene, 2,3-dimethylbutene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, and 5-decene. Propylene and isobutylene can be preferred olefins due to their relatively low cost. Highly substituted olefins are preferred because they can stabilize a carbocation intermediate more readily than unsubstituted olefins, thus facilitating the etherification reaction. However, olefins can rearrange under acidic conditions, so even alpha olefins can be used and still form branched ethers.

In one embodiment, the olefins are a mixture of olefins, in unpurified form, obtained by the cracking of crude oil. Since virtually any olefin will form a combustible product (in this case, an ether), it is unnecessary to form fatty acid esters or glycerol ethers from pure olefins.

Any acid catalyst that is suitable for performing etherifications can be used, in any effective amount and any effective concentration. Examples of suitable acids include, but are not limited to, hydrochloric acid, hydrobromic acid, sulfuric acid, nitric acid, and solid catalysts such as Dowex 50™. Strong acids are preferred catalysts. The most preferred acid catalyst is sulfuric acid.

The presence of glyceryl ethers in certain fuel compositions, such as biodiesel fuel, diesel fuel, jet fuel, marine diesel fuel, and flexible fuel compositions, can help lower the gel temperature of the fuel, i.e., the temperature at which the fuel becomes so viscous that it cannot be used. While not wishing to be bound to a particular theory, it is believed that the presence of hydroxy groups on partially etherified glycerol derivatives can lower the nitrogen oxide emissions and particulate emissions of these fuel compositions.

III. Alcohols

Any alcohol that provides a fuel composition with the desired properties can be used to prepare either the fuel compositions. Suitable alcohols for use in the present invention include, but are not limited to, saturated straight, branched, or cyclic alcohols of $C_{1-6}$, and specifically include methanol, ethanol, propanol, isopropanol, butanol, isobutanol, t-butanol, pentanol, cyclopentanol, isopentanol, neopentanol, hexanol, isohexanol, cyclohexanol, 3-methylpentanol, 2,2-dimethylbutanol, and 2,3-dimethylbutanol. Ethanol is generally available commercially in a denatured form, for example, grade 3A, which contains minor amounts of methanol and water. The ethanol can be that which is produced commercially from addition of water across the double bond in ethylene, and by fermentation of grains. It is preferred that any alcohol used in the present invention contains less than five percent water, preferably less than approximately one percent water.

The amount of alcohol that can be present in the gasoline/alcohol blends and in the diesel/alcohol blends can vary. The alcohol, such as methanol or ethanol, can be present in an amount up to about 90 percent by volume of the fuel. Representative fuel compositions including the alcohol include E85 (85% ethanol/15% gasoline) and E10 (10% ethanol/90% gasoline).

In one embodiment, the amount of alcohol is between about 1 and 20 percent by volume, and more ideally, about 15 to 20 percent by volume.

In another embodiment, the amount of alcohol is between about 75 and 85 percent by volume, and more ideally, about 15 to 20 percent by volume.

Diesel fuel/alcohol blends including between about 75 and 95% diesel/5 and 25% alcohol, ideally, about 90% diesel and about 10% alcohol, are combined with glycerol ethers.

IV. Optional Additional Components

The fuel compositions can optionally, but preferably, include one or more additives, such as lubricants, emulsifiers, wetting agents, densifiers, fluid-loss additives, corrosion inhibitors, oxidation inhibitors, friction modifiers, demulsifiers, anti-wear agents, anti-foaming agents, detergents, rust inhibitors and the like. Other hydrocarbons, such as those described in U.S. Pat. No. 5,096,883 and/or U.S. Pat. No. 5,189,012, the contents of which are hereby incorporated by reference, can be blended with the fuel, provided that the final blend has the necessary octane/cetane values, pour, cloud and freeze points, kinematic viscosity, flash point, and toxicity properties. The total amount of additives is preferably between 50-100 ppm by weight for 4-stroke engine fuel, and for 2-stroke engine fuel, additional lubricant oil may be added.

Diesel fuel additives are used for a wide variety of purposes; however, they can be grouped into four major categories: engine performance, fuel stability, fuel handling, and contaminant control additives.

Engine performance additives can be added to improve engine performance. Cetane number improvers (diesel ignition improvers) can be added to reduce combustion noise and smoke. 2-Ethylhexyl nitrate (EHN) is the most widely used cetane number improver. It is sometimes also called octyl nitrate. EHN typically is used in the concentration range of 0.05% mass to 0.4% mass and may yield a 3 to 8 cetane number benefit. Other alkyl nitrates, ether nitrates some nitroso compounds, and di-tertiary butyl peroxide can also be used.

Fuel and/or crankcase lubricant can form deposits in the nozzle area of injectors—the area exposed to high cylinder temperatures. Injector cleanliness additives can be added to minimize these problems. Ashless polymeric detergent additives can be added to clean up fuel injector deposits and/or keep injectors clean. These additives include a polar group that bonds to deposits and deposit precursors and a non-polar group that dissolves in the fuel. Detergent additives are typically used in the concentration range of 50 ppm to 300 ppm. Examples of detergents and metal rust inhibitors include the metal salts of sulfonic acids, alkylphenols, sulfurized alkylphenols, alkyl salicylates, naphthenates and other oil soluble mono and dicarboxylic acids such as tetrapropyl succinic anhydride. Neutral or highly basic metal salts such as highly basic alkaline earth metal sulfonates (especially calcium and magnesium salts) are frequently used as such detergents. Also useful is nonylphenol sulfide. Similar materials made by reacting an alkylphenol with commercial sulfur dichlorides. Suitable alkylphenol sulfides can also be prepared by reacting alkylphenols with elemental sulfur. Also suitable as detergents are neutral and basic salts of phenols, generally known as phenates, wherein the phenol is generally an alkyl substituted phenolic group, where the substituent is an aliphatic hydrocarbon group having about 4 to 400 carbon atoms.

Lubricity additives can also be added. Lubricity additives are typically fatty acids and/or fatty esters. Examples of suitable lubricants include polyol esters of $C_{12-28}$ acids. The fatty acids are typically used in the concentration range of 10 ppm to 50 ppm, and the esters are typically used in the range of 50 ppm to 250 ppm.

Some organometallic compounds, for example, barium organometallics, act as combustion catalysts, and can be used as smoke suppressants. Adding these compounds to fuel can reduce the black smoke emissions that result from incomplete combustion. Smoke suppressants based on other metals, e.g., iron, cerium, or platinum, can also be used.

Anti-foaming additives such as organosilicone compounds can be used, typically at concentrations of 10 ppm or less. Examples of anti-foaming agents include polysiloxanes such as silicone oil and polydimethyl siloxane; acrylate polymers are also suitable.

Low molecular weight alcohols or glycols can be added to diesel fuel to prevent ice formation.

Additional additives are used to lower a diesel fuel's pour point (gel point) or cloud point, or improve its cold flow properties. Most of these additives are polymers that interact with the wax crystals that form in diesel fuel when it is cooled below the cloud point.

Drag reducing additives can also be added to increase the volume of the product that can be delivered. Drag reducing additives are typically used in concentrations below 15 ppm.

Antioxidants can be added to the distillate fuel to neutralize or minimize degradation chemistry. Suitable antioxidants include, for example, hindered phenols and certain amines, such as phenylenediamine. They are typically used in the concentration range of 10 ppm to 80 ppm. Examples of antioxidants include those described in U.S. Pat. No. 5,200,101, the contents of which are hereby incorporated by reference. The '101 patent discloses certain amine/hindered phenol, acid anhydride and thiol ester-derived products.

Acid-base reactions are another mode of fuel instability. Stabilizers such as strongly basic amines can be added, typically in the concentration range of 50 ppm to 150 ppm, to counteract these effects.

Metal deactivators can be used to tie up (chelate) various metal impurities, neutralizing their catalytic effects on fuel performance. They are typically used in the concentration range of 1 ppm to 15 ppm.

Multi-component fuel stabilizer packages may contain a dispersant. Dispersants are typically used in the concentration range of 15 ppm to 100 ppm.

Biocides can be used when contamination by microorganisms reaches problem levels. Preferred biocides dissolve in both the fuel and water and can attack the microbes in both phases. Biocides are typically used in the concentration range of 200 ppm to 600 ppm.

Demulsifiers are surfactants that break up emulsions and allow fuel and water phases to separate. Demulsifiers typically are used in the concentration range of 5 ppm to 30 ppm.

Dispersants are well known in the lubricating oil field and include high molecular weight alkyl succinimides being the reaction products of oil soluble polyisobutylene succinic anhydride with ethylene amines such as tetraethylene pentamine and borated salts thereof.

Corrosion inhibitors are compounds that attach to metal surfaces and form a barrier that prevents attack by corrosive agents. They typically are used in the concentration range of 5 ppm to 15 ppm. Examples of suitable corrosion inhibitors include phosphosulfurized hydrocarbons and the products obtained by reacting a phosphosulfurized hydrocarbon with an alkaline earth metal oxide or hydroxide.

Examples of oxidation inhibitors include antioxidants such as alkaline earth metal salts of alkylphenol thioesters having preferably $C_{5-12}$ alkyl side chain such as calcium nonylphenol sulfide, barium t-octylphenol sulfide, dioctylphenylamine as well as sulfurized or phosphosulfurized hydrocarbons. Additional examples include oil soluble antioxidant copper compounds such as copper salts of $C_{10-18}$ oil soluble fatty acids.

Examples of friction modifiers include fatty acid esters and amides, glycerol esters of dimerized fatty acids and succinate esters or metal salts thereof.

Pour point depressants such as $C_{8-18}$ dialkyl fumarate vinyl acetate copolymers, polymethacrylates and wax naphthalene are well known to those of skill in the art.

Examples of anti-wear agents include zinc dialkyldithiophosphate, zinc diary diphosphate, and sulfurized isobutylene. Additional additives are described in U.S. Pat. No. 5,898,023 to Francisco, et al., the contents of which are hereby incorporated by reference.

V. Alternative Fuel Compositions

The alternative fuel composition described herein can be prepared by mixing gasoline, diesel fuel, marine diesel fuel, or jet fuel, with the alcohol and/or the glycerol ethers, in any suitable manner, and in any desired ratio.

In one embodiment, the gasoline or diesel fuel is present in a range of about 75 to 85 percent, between 10 and 20 percent alcohol, each by volume, and the balance being glycerol ethers and other additives as described above. For example, a mixture of about 80 percent fuel, about 15 percent alcohol and about 5 percent glycerol ethers can be used. In another embodiment, the gasoline is present in an amount of about 15 percent, and the alcohol is present in an amount of about 85%, before addition of about 1 to about 12, preferably between about 2 to about 10 percent glycerol ethers by volume.

Optimum selection of an appropriate ratio of fuel, alcohol and glycerol ethers will depend on a variety of factors, including the season (i.e., winter, summer, spring and fall), altitude, type of alcohol, type of fuel, and type of glyceryl ether.

When used to form a gasoline composition, when the alcohol is methanol or ethanol, one can identify a sufficient quantity of glycerol ether to reduce the vapor pressure to a desired level by simply adding glycerol ethers and measuring the vapor pressure until the desired vapor pressure is reached. Those of skill in the art can readily measure the vapor pressure of the fuel compositions described herein. Alcohols with higher molecular weights may not have the same vapor pressure problems as methanol or ethanol.

When it is desired to increase the fuel economy of a fuel composition, such as a gasoline/alcohol composition, one can simply add sufficient glycerol ethers to improve the fuel economy to a desired level.

When used to form a diesel composition, when the alcohol is methanol or ethanol, one can identify a sufficient quantity of glycerol ethers to add to the diesel/alcohol mixture by continuously adding glycerol ethers until the desired cetane values (or other performance parameters) are met. Those of skill in the art can readily measure cetane values (and other performance parameters for diesel fuel) of diesel fuel compositions. Also, when it is desirable to reduce particulate emissions, one can add glycerol ethers until the desired reduction in the level of particulate emissions is reached. One of skill in the art can readily measure particulate emissions.

When used in marine diesel, where particulate emissions are generally a significant problem (i.e., roughly fifty times the emissions of gasoline and thirty times that of diesel fuel), the addition of between about 0.5 and 12 percent by volume of the glycerol ethers can help reduce the particulate emissions. If even a 1% reduction in marine diesel particulate emissions is obtained, then the effect would be environmentally significant. That is, if the world's marine diesel had a 1% volume in particulate emissions, if would be roughly equivalent to a decrease of half of the particulate emissions of every car in the United States.

When used in jet fuel, the glycerol ethers can replace all or part of the conventional deicing additives, such as ethylene glycol monomethyl ether, which are known to cause dermal toxicity and allergic reactions such as dermatitis. When present in suitable concentrations to reduce particulate emissions, the glycerol ethers can reduce the appearance of contrails. The glycerol ethers can be present in amounts ranging from about 0.5 and 10, preferably between about 1 and about 5, more preferably between about 1 and 3 percent by volume of the jet fuel.

In lieu of, or in addition to, glycerol ethers, blends of lower molecular weight alcohols such as methanol and ethanol, and higher molecular weight alcohols such as butanol, iso-butanol, and t-butanol, on up to octanol or higher, can be used. T-butanol has roughly the same BTU value as gasoline, and has a relatively high octane, and accordingly, can increase the miles per gallon of an ethanol/gasoline blend like E5, E10, E15, E25, E40, E85, and the like. Ethanol and butanol can be preferred fuel additives, since they are both available as renewable resources, i.e., from the fermentation of sugars.

In one aspect, the invention is directed to compositions including gasoline, ethanol, and butanol. In one embodiment of this aspect, at least a portion of the ethanol and/or butanol are derived from renewable resources.

The fuel composition can be formed by mixing/blending the diesel fuel, marine diesel fuel, jet fuel, or gasoline, the alcohol(s) and/or the glycerol ether(s). Means for mixing these components are well known to those of skill in the art. During blending, it can be advantageous to remove aliquots of the fuel composition and measure various properties, such as vapor pressure and cetane values, to ensure that the mixture/blend has the desired properties.

The resulting fuel compositions can be used in any gasoline or diesel engine (depending on whether the starting fuel is diesel or gasoline) under typical conditions for using the fuel itself (i.e., without the added alcohol(s) and/or glycerol ether(s)).

VI. Fuel Additives

The glycerol ethers described herein can be used in fuel additives compositions. The fuel additives include, in addition to the glycerol ethers, hydrocarbons, such as jet fuel or kerosene, and/or alcohols such as ethanol or methanol. The fuel additive compositions can be used in gasoline, diesel, marine diesel, jet, and flexible fuel engines to provide a better fuel product than that produced entirely from crude oil.

Especially preferred additives are 1,3 di-t-butyl glycerol or mixtures of 1,3 di-t-butyl glycerol with 1,2 di-t-butyl glycerol and 1,2,3 tri-t-butyl glycerol. These additives have good solubilities in diesel fuel hydrocarbons, have superior water partition coefficient characteristics and are effective in reducing particulate matter emissions.

A. Optional Additional Components

The fuel additive compositions can optionally, but preferably, include one or more additives, such as lubricants, emulsifiers, wetting agents, densifiers, fluid-loss additives, corrosion inhibitors, oxidation inhibitors, friction modifiers, demulsifiers, anti-wear agents, anti-foaming agents, detergents, rust inhibitors and the like. Other hydrocarbons, such as those described in U.S. Pat. No. 5,096,883 and/or U.S. Pat. No. 5,189,012, the contents of which are hereby incorporated by reference, can be blended with the fuel additive, provided that the final blend has the necessary octane/cetane values, pour, cloud and freeze points, kinematic viscosity, flash point, and toxicity properties. The total amount of additives is preferably between 50-100 ppm by weight for 4-stroke engine fuel, and for 2-stroke engine fuel, additional lubricant oil may be added.

Diesel fuel additives are used for a wide variety of purposes; however, they can be grouped into four major categories: engine performance, fuel stability, fuel handling, and contaminant control additives.

Engine performance additives can be added to improve engine performance. Cetane number improvers (diesel ignition improvers) can be added to reduce combustion noise and smoke. 2-Ethylhexyl nitrate (EHN) is the most widely used cetane number improver. It is sometimes also called octyl nitrate. EHN typically is used in the concentration range of 0.05% mass to 0.4% mass and may yield a 3 to 8 cetane number benefit. Other alkyl nitrates, ether nitrates, some nitroso compounds, and di-tertiary butyl peroxide can also be used.

Fuel and/or crankcase lubricant can form deposits in the nozzle area of injectors—the area exposed to high cylinder temperatures. Injector cleanliness additives can be added to minimize these problems. Ashless polymeric detergent additives can be added to clean up fuel injector deposits and/or keep injectors clean. These additives include a polar group that bonds to deposits and deposit precursors and a nonpolar group that dissolves in the fuel. Detergent additives are typically used in the concentration range of 50 ppm to 300 ppm. Examples of detergents and metal rust inhibitors include the metal salts of sulfonic acids, alkylphenols, sulfurized alkylphenols, alkyl salicylates, naphthenates and other oil soluble mono and dicarboxylic acids such as tetrapropyl succinic anhydride. Neutral or highly basic metal salts such as highly basic alkaline earth metal sulfonates (especially calcium and magnesium salts) are frequently used as such detergents. Also useful is nonylphenol sulfide. Similar materials can be made by reacting an alkylphenol with commercial sulfur dichlorides. Suitable alkylphenol sulfides can also be prepared by reacting alkylphenols with elemental sulfur. Also suitable as detergents are neutral and basic salts of phenols, generally known as phenates, wherein the phenol is generally an alkyl substituted phenolic group, where the substituent is an aliphatic hydrocarbon group having about 4 to 400 carbon atoms.

Lubricity additives can also be added. Lubricity additives are typically fatty acids and/or fatty esters. Examples of suitable lubricants include polyol esters of $C_{12-28}$ acids. The fatty acids are typically used in the concentration range of 10 ppm to 50 ppm, and the esters are typically used in the range of 50 ppm to 250 ppm.

Some organometallic compounds, for example, barium organometallics, act as combustion catalysts, and can be used as smoke suppressants. Adding these compounds to fuel can reduce the black smoke emissions that result from incomplete combustion. Smoke suppressants based on other metals, e.g., iron, cerium, or platinum, can also be used.

Anti-foaming additives such as organosilicone compounds can be used, typically at concentrations of 10 ppm or less. Examples of anti-foaming agents include polysiloxanes such as silicone oil and polydimethyl siloxane; acrylate polymers are also suitable.

Low molecular weight alcohols or glycols can be added to diesel fuel to prevent ice formation.

Additional additives are used to lower a diesel fuel's pour point (gel point) or cloud point, or improve its cold flow properties. Most of these additives are polymers that interact with the wax crystals that form in diesel fuel when it is cooled below the cloud point.

Drag reducing additives can also be added to increase the volume of the product that can be delivered. Drag reducing additives are typically used in concentrations below 15 ppm.

Antioxidants can be added to the distillate fuel to neutralize or minimize degradation chemistry. Suitable antioxidants include, for example, hindered phenols and certain amines, such as phenylenediamine. They are typically used in the concentration range of 10 ppm to 80 ppm. Examples of antioxidants include those described in U.S. Pat. No. 5,200,101, the contents of which are hereby incorporated by reference. The '101 patent discloses certain amine/hindered phenol, acid anhydride and thiol ester-derived products.

Acid-base reactions are another mode of fuel instability. Stabilizers such as strongly basic amines can be added, typically in the concentration range of 50 ppm to 150 ppm, to counteract these effects.

Metal deactivators can be used to tie up (chelate) various metal impurities, neutralizing their catalytic effects on fuel performance. They are typically used in the concentration range of 1 ppm to 15 ppm.

Multi-component fuel stabilizer packages may contain a dispersant. Dispersants are typically used in the concentration range of 15 ppm to 100 ppm.

Biocides can be used when contamination by microorganisms reaches problem levels. Preferred biocides dissolve in both the fuel and water and can attack the microbes in both phases. Biocides are typically used in the concentration range of 200 ppm to 600 ppm.

Demulsifiers are surfactants that break up emulsions and allow fuel and water phases to separate. Demulsifiers typically are used in the concentration range of 5 ppm to 30 ppm.

Dispersants are well known in the lubricating oil field and include high molecular weight alkyl succinimides being the reaction products of oil soluble polyisobutylene succinic anhydride with ethylene amines such as tetraethylene pentamine and borated salts thereof.

Corrosion inhibitors are compounds that attach to metal surfaces and form a barrier that prevents attack by corrosive agents. They typically are used in the concentration range of 5 ppm to 15 ppm. Examples of suitable corrosion inhibitors include phosphosulfurized hydrocarbons and the products obtained by reacting a phosphosulfurized hydrocarbon with an alkaline earth metal oxide or hydroxide.

Examples of oxidation inhibitors include antioxidants such as alkaline earth metal salts of alkylphenol thioesters having preferably $C_{5-12}$ alkyl side chain such as calcium nonylphenol sulfide, barium t-octylphenol sulfide, dioctylphenylamine as well as sulfurized or phosphosulfurized hydrocarbons. Additional examples include oil soluble antioxidant copper compounds such as copper salts of $C_{10-18}$ oil soluble fatty acids.

Examples of friction modifiers include fatty acid esters and amides, glycerol esters of dimerized fatty acids and succinate esters or metal salts thereof.

Pour point depressants such as $C_{8-18}$ dialkyl fumarate vinyl acetate copolymers, polymethacrylates and wax naphthalene are well known to those of skill in the art.

Examples of anti-wear agents include zinc dialkyldithiophosphate, zinc diary diphosphate, and sulfurized isobutylene. Additional additives are described in U.S. Pat. No. 5,898,023 to Francisco et al., the contents of which are hereby incorporated by reference.

The term xylenes refers to a group of 3 benzene derivatives which encompasses ortho-, meta-, and para-isomers of dimethyl benzene. The o-, m- and p-isomers specify to which carbon atoms (of the main benzene ring) the two methyl groups are attached. Counting the carbon atoms from one of the ring carbons bonded to a methyl group, and counting towards the second ring carbon bonded to a methyl group, the o-isomer has the IUPAC name of 1,2-dimethylbenzene. The m-isomer has the IUPAC name of 1,3-dimethylbenzene. The p-isomer has the IUPAC name of 1,4-dimethylbenzene. Chemical industries produce xylene from petroleum. It is one of the top 30 chemicals produced in the United States in terms of volume. Xylene is used as a solvent and in the printing, rubber, and leather industries. p-Xylene is used as a feedstock in the production of terephthalic acid, which is a monomer used in the production of polymers. It is found in small amounts in airplane fuel and gasoline. With oxidizing agents, such as potassium permanganate ($KMnO_4$), the methyl group can be oxidized to a carboxylic acid. By oxidizing both methyl groups towards the acid, o-xylene forms phthalic acid, whereas p-xylene forms terephthalic acid.

Mesitylene, also known as 1,3,5-trimethylbenzene ($C_9H_{12}$), is an aromatic hydrocarbon with three methyl substituents attached to the benzene ring. It can be prepared from distilling acetone with sulfuric acid or by trimerizing propyne in sulfuric acid, which in both cases acts as a homogenous catalyst and dehydrating agent. Mesitylene is flammable, is an irritant, and has a very low freezing point.

Jet fuels have been described above. The jet fuel most widely used in jet fuel additives is JP5, although other jet fuels can be used.

Stoddard solvent, also known as White spirit, is a paraffin-derived clear, transparent liquid which is a common organic solvent used in painting and decorating. It is a mixture of saturated aliphatic and alicyclic $C_7$ to $C_{12}$ hydrocarbons with a maximum content of 25% of $C_7$ to $C_{12}$ alkyl aromatic hydrocarbons.

Naphtha is a group of various volatile flammable liquid hydrocarbon mixtures obtained from petroleum refineries as a portion of the distillation (also referred to as a cut). It is an intermediate between the lighter gasoline and the heavier benzene. Naphtha has a specific gravity of about 0.7. The generic name naphtha describes a range of different refinery cuts used in the different applications. Those of skill in the art know what naptha is, though similar naphtha types are often referred to by different names. The different naphthas are distinguished by: 1) density; and 2) PONA or PIONA analysis, which measures: a) Paraffin content; b) Isoparaffin content; c) Olefins content; d) Naphthenes content; e) Aromatics content. Generally speaking, "lighter" or, rather, less dense naphthas will have a higher paraffin content; and are therefore also referred to as paraffinic naphtha, "light distillate feedstock" or LDF. The "heavier," or, rather, denser types are usually richer in naphthenes and aromatics, and therefore also referred to as N&A's. Alternative names for these types are Straight Run Benzene (SRB) or Heavy Virgin Naphtha (HVN).

Magnesium oxide (MgO) is a white solid mineral that occurs naturally as periclase and is a source of magnesium.

Preparation of Fuel Additives

The fuel additives described herein can be prepared by mixing between approximately 80 to 99.7 percent gasoline, diesel, marine diesel, jet fuel, or flexible fuel and between approximately 0.3 to 20 percent of the fuel additive composition, each by volume. The components can be mixed in any suitable manner. Optimum selection of an appropriate ratio of fuel and fuel additive composition will depend on a variety of factors, including the season (i.e., winter, summer, spring and fall), altitude, type of alcohol, type of fuel, and type of glycerol ether.

When used to form a diesel composition, one can identify a sufficient quantity of the fuel additive to add to the diesel fuel by continuously adding the composition until the desired cetane values (or other performance parameters) are met. Those of skill in the art can readily measure cetane values (and other performance parameters for diesel fuel) of diesel fuel compositions.

The fuel additive composition can be formed by mixing/blending the glycerol ether(s) and the hydrocarbon component, as well as any optional components that are added. Means for mixing these components are well known to those of skill in the art. During blending, it can be advantageous to remove aliquots of the fuel additive composition and measure various properties, such as vapor pressure and cetane values, to ensure that the mixture/blend has the desired properties.

The resulting fuel compositions can be used in any gasoline or diesel engine (depending on whether the starting fuel is diesel or gasoline) under typical conditions for using the fuel itself (i.e., without the added fuel additive composition).

The contents of each of the publications described herein are hereby incorporated by reference. Modifications and variations of the present invention relating to alternative fuels, fuel additive compositions, and blends of the fuel additive compositions with gasoline, diesel, marine diesel, jet, or flexible fuels will be obvious to those skilled in the art from the foregoing detailed description of the invention.

The invention claimed is:

1. A composition, comprising:
   a) a gasoline/ethanol blend comprising between about 15 and about 95 percent by volume of gasoline, and between about 1 and about 20 percent by volume of ethanol,
   b) between about 0.5 and 8 percent by volume of a mixture of glycerol ethers by volume of the gasoline/ethanol blend, and
   c) optionally, one or more conventional fuel additives,
   wherein the mixture of glycerol ethers comprises a glycerol di-t-butyl ether.

2. The composition of claim 1, wherein the composition comprises a gasoline/ethanol blend comprising between about 75 and about 85 percent by volume of gasoline and between about 10 and about 20 percent by volume of ethanol.

3. A jet fuel composition, comprising hydrocarbons in the molecular weight range of between about 5 and 20, and a mixture of glycerol ethers, wherein the glycerol ethers are present in a range of between about 0.5 and 8 percent by volume, wherein the mixture of glycerol ethers comprises a glycerol $C_{3-5}$ dialkyl ether.

4. The jet fuel composition of claim 3, comprising JP-8.

5. The composition of claim 3, wherein the mixture of glycerol ethers comprises a glycerol di-isopropyl ether.

6. The composition of claim 1, wherein the composition consists essentially of:
   a) a gasoline/ethanol blend comprising between about 75 and about 95 percent by volume of gasoline, and between about 1 and about 20 percent by volume of ethanol, and
   b) between about 0.5 and 8 percent by volume of a mixture of glycerol ethers by volume of the gasoline/ethanol blend, and
   wherein the mixture of glycerol ethers comprises a glycerol di-t-butyl ether.

* * * * *